US006101080A

United States Patent [19]

Kühne

[11] Patent Number: 6,101,080

[45] Date of Patent: Aug. 8, 2000

[54] EMP-CHARGE ELIMINATOR

[75] Inventor: Gregor Kühne, St. Gallen, Switzerland

[73] Assignee: Huber & Suhner AG, Herisau, Switzerland

[21] Appl. No.: 09/249,930

[22] Filed: Feb. 12, 1999

[30] Foreign Application Priority Data

Feb. 17, 1998 [CH] Switzerland ............................ 0378/98

[51] Int. Cl.[7] ........................................................ H02H 1/00

[52] U.S. Cl. ............................. 361/119; 361/56; 361/111; 361/120

[58] Field of Search .............................. 361/56, 111, 113, 361/115, 119, 127, 91.1, 120

[56] References Cited

U.S. PATENT DOCUMENTS 5,122,921 6/1992 Koss ........................................ 361/111

*Primary Examiner*—Stephen W. Jackson
*Attorney, Agent, or Firm*—Jay H. Maioli

[57] ABSTRACT

The invention concerns an de-coupled EMP-charge eliminator device in a co-axial cable, with charge eliminator component (28) in electric contact with conductor (24) leading to the internal conductor of the co-axial lead (30), and with a housing (20) attached to an external conductor (10), whereby a concentrated capacitor (41) is inserted, in parallel, between housing (20) and conductor (24), and that this becomes, via the capacitance of the capacitor (41), a RF-short circuit breaker so that conductor (24) acts as a lamda/4 shortcircuit conductor.

12 Claims, 6 Drawing Sheets

EMP-CHARGE ELIMINATOR

Figure 1:
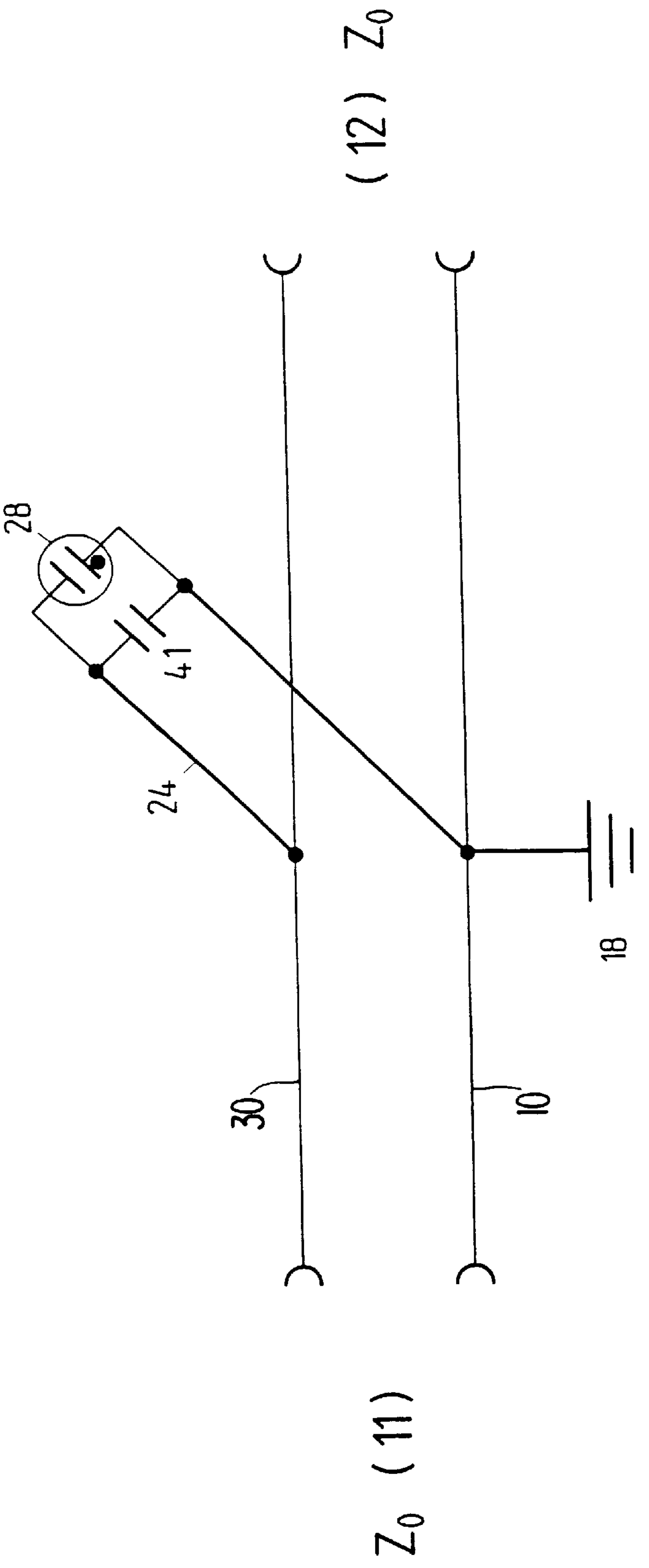

This invention concerns a EMP-charge eliminator device for a co-axial electric cable consisting of a lamda/4 line, connected to a housing joining the external conductor and also to the internal conductor of the co-axial cable, at the end of which there is an charge eliminator component connected to the housing according to the definitions given in the claims.

Artificially created electromagnetic impulses, as may be produced by motors, switches, phased or oscillating circuits or similar, as well as those caused naturally from direct or indirect lightening strikes, are transmitted by means of inductive, capacitative or galvanic connectors through co-axial cables and may damage or even destroy electrical equipment connected to these lines. It is common practice to protect such equipment, at the input point, against substantial voltage overloads, interferance voltages or lightening surges by means of devices which eliminate or deflect these impulses. For example, there are EMP-Gas-Eliminators also called EMP Charge Eliminators, with which such damaging currents, voltages and certain frequencies may be eliminated or deflected. Such circuits are described in Swiss Patent CH-660261 and Swiss Patent Applications 914/95 and 158/97.

The Swiss Patent Application 158/97 provides that interfering currents and voltages are eliminated or deflected by means of a gas discharge voltage overload eliminator which is located between and connects the external conductor of the co-axial cable and the lamda/2 line. This lamda/2 line with its resonant cavity and the gas discharge voltage overload eliminator connected in series, acts as a filter sensitive to frequencies over a number of frequency bands, which is also able to simultaneously transmit AC/DC supply voltages.

The presently known protective circuits with gas discharge voltage overload eliminators exhibit a number of disadvantages, such as the generation of intermodulation products during the transmission of HF capacity. The RF capacity generates a certain pre-ionisation which cause lower reset characteristics in the gas discharge voltage overload eliminators. Furthermore, the static response voltage of the gas discharge voltage overload eliminators is dependent on the RF transmission capacity. These disadvantages limit the application of the such gas discharge eliminators for branched circuits.

It is the object of this invention to create an EMP-charge eliminator which does not generate intermodulation products during RF capacity transmission, which does not show a decline in reset characteristics, which is independent of the chosen transmission capacity and which is fitted with a voltage overload eliminator of the smallest possible response voltage and which, at the same time, allows the transmission of AC/DC supply voltages.

These objectives are achieved by the claims which define this invention.

The EMP-charge eliminator device according to claim 1 incorporates an charge eliminator component, interchangibly inserted, in parallel, between the housing and a electrically extended lamda/4 line and a capacitor. This charge eliminator component connects the conductor for the RF with the housing and forms a parallel oscilatory circuit with the lamda/4 line. Gas discharge voltage overload eliminators, Varistors (variable resistors) and well as different types of diodes are all suitable as voltage overload eliminator components.

Such a circuit enables the transmission of AC/DC supply voltages and is also suited for the simultaneous transmission of RF frequency bands of high capacity without the generation of intermodulation products or that the reset characteristics decrease when a gas discharge voltage overload eliminator is used. Furthermore, such an arrangement of the circuit enables the transmission of high RF capacities, this in broad frequency bands, at very high, and in principle maximally unlimited, frequencies and with the smallest possible response voltage of the voltage overload eliminator. With this invention, appliances may be supplied with AC/DC power at the same time effectively protected from damaging current surges.

Figure 2:
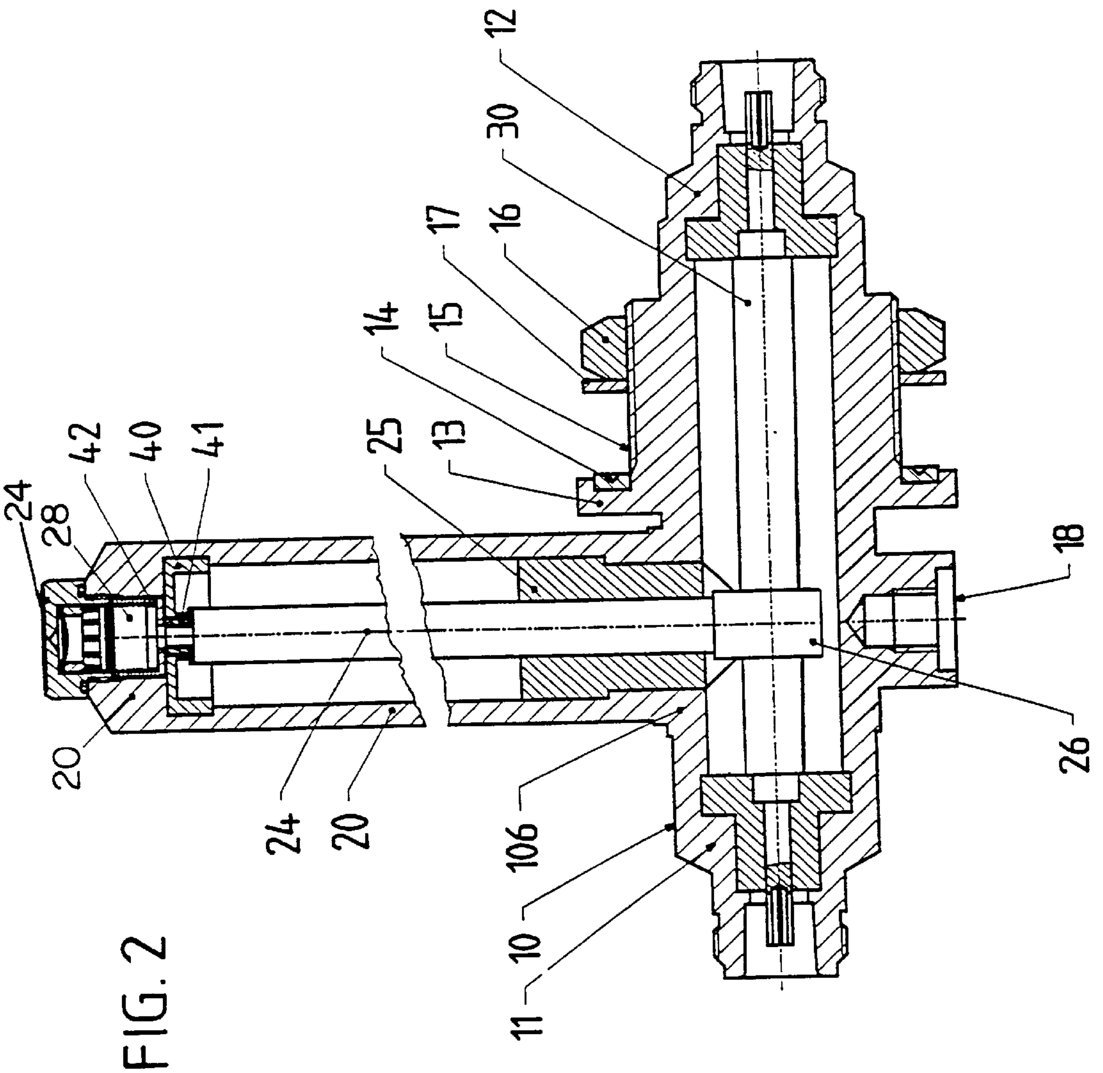
Figure 3:
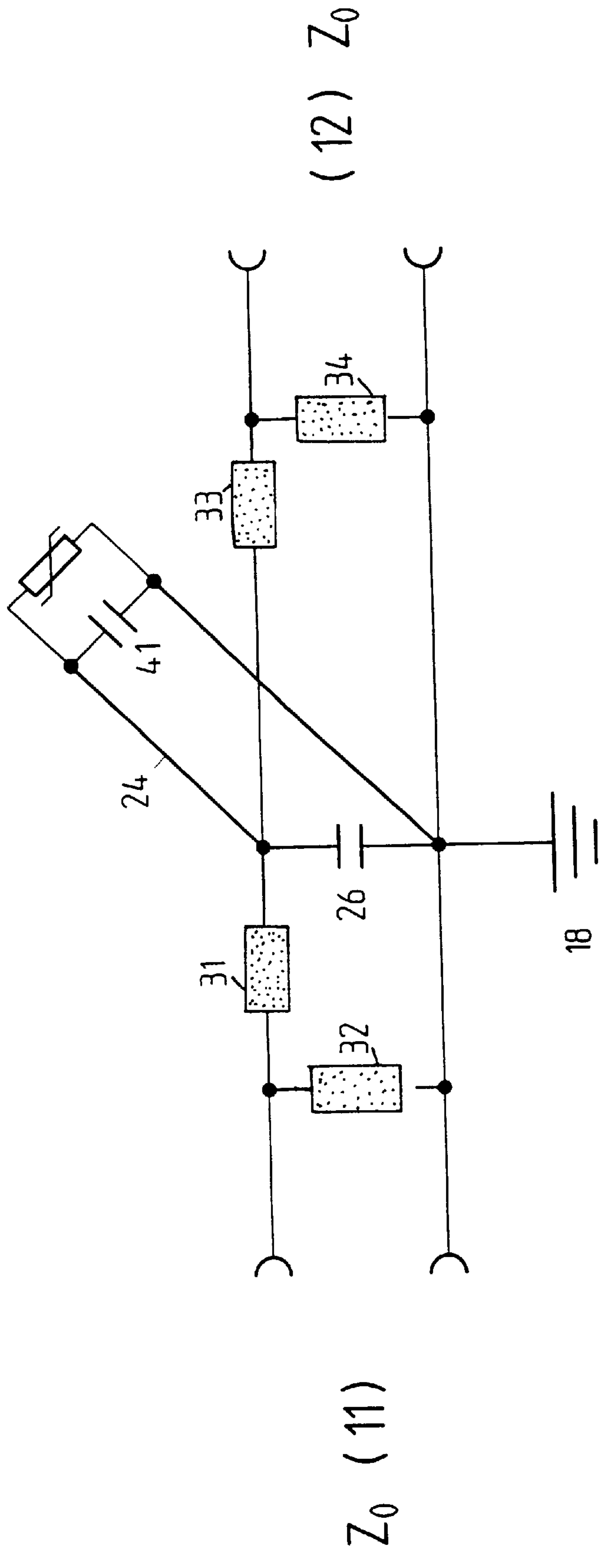
Figure 4:
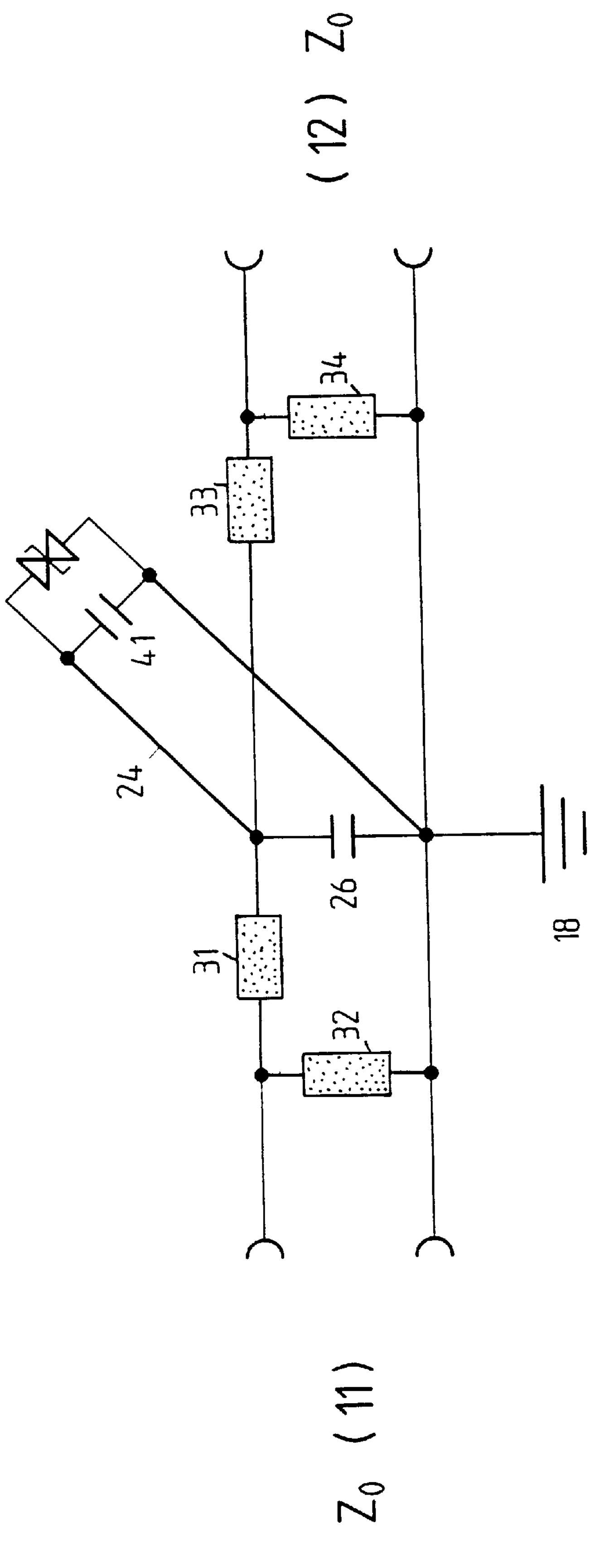
Figure 5:
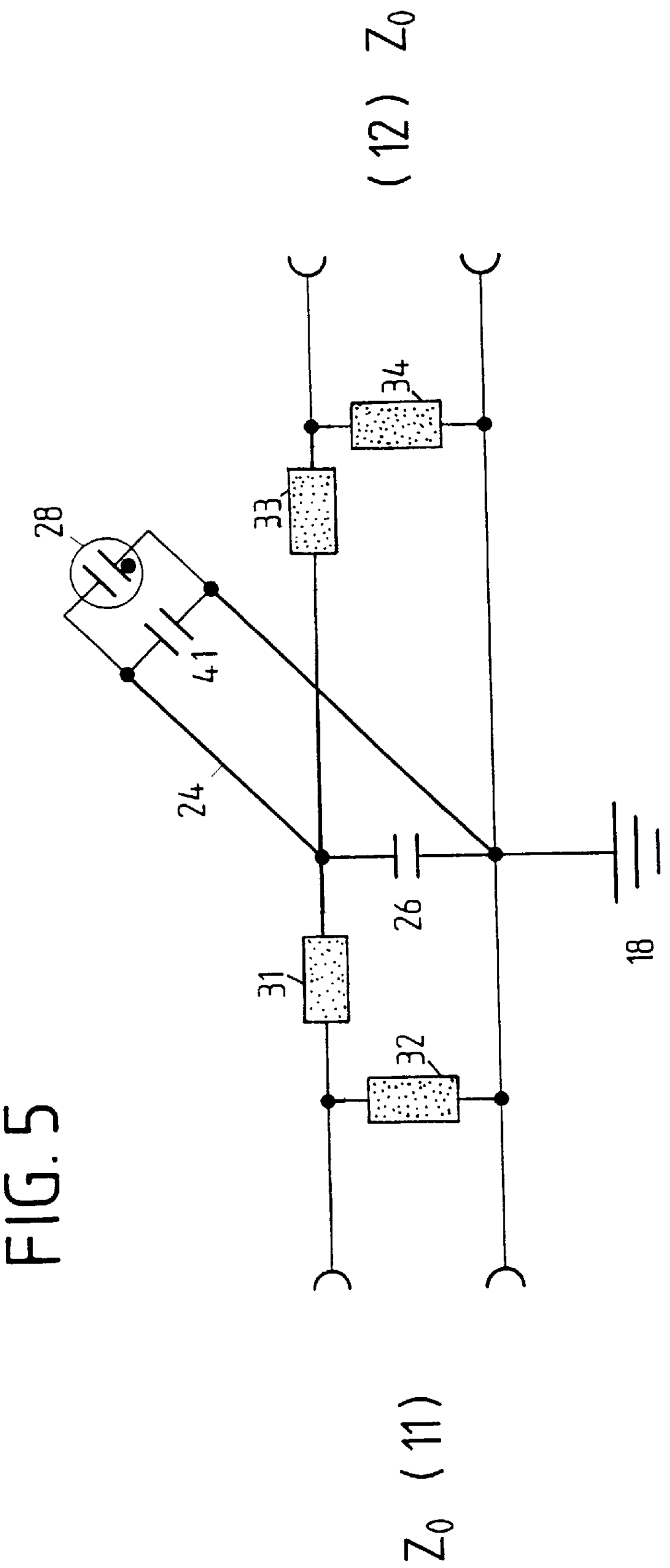

Some preferred embodiments of this invention are described in the following:

FIG. 1 shows, in principle, a electic circuit of the first preferred embodiment of an de-coupled EMP-charge eliminator device with a gas discharge voltage overload eliminator as the charge eliminator component, FIG. 2 shows, by way of example, a cross-sectional view through a part of the first preferred embodiment of the EMP-charge eliminator device according to FIG. 1, FIG. 3 shows, in principle, a electic circuit of a further preferred embodiment of an de-coupled EMP-charge eliminator device with a Varistor as the charge eliminator component, FIG. 4 shows, in principle, a electic circuit of a further preferred embodiment of an de-coupled EMP-charge eliminator device with a diode as the charge eliminator component, FIG. 5 shows, in principle, a electic circuit of a further preferred embodiment of an de-coupled EMP-charge eliminator device with differing conductor segments along the main electrical conductor.

Figure 6:
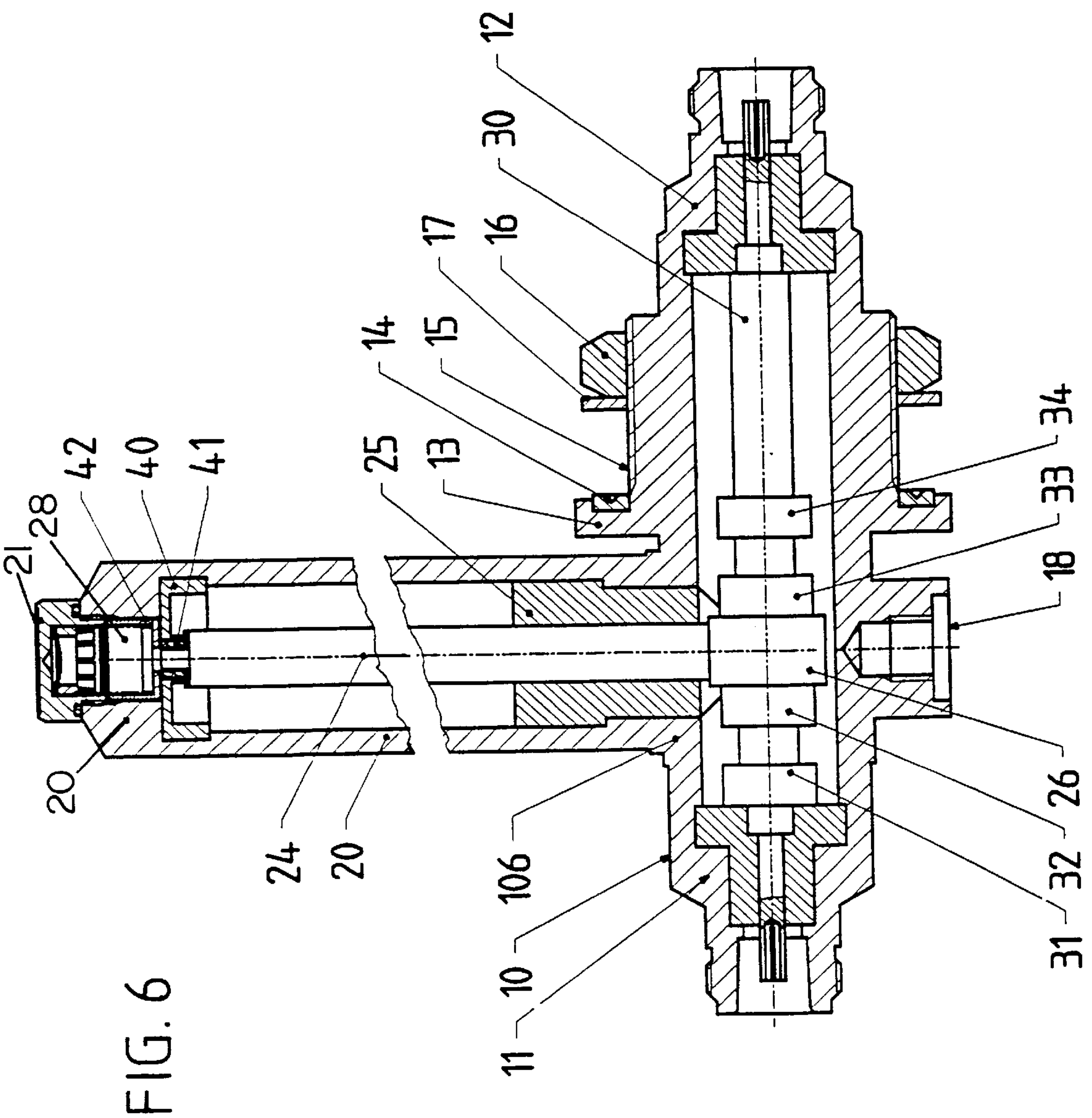

FIG. 6 shows, by way of example, a cross-sectional view through a part of a further preferred embodiment of the EMP-charge eliminator device according to FIG. 5.

By way of example, the EMP-charge eliminator device, created as a plug-in device, and according to the cross-sectional view depicted in FIG. 2 or 6, it consists of a external conductor 10 in the form of a cylindrical housing with couplings 11 and 12 at both ends as screw or plug connectors for co-axial electical conductors. The coupling 11, to the left in the drawing, is designed as the connection to the unprotected side, while coupling 12, to the right in the drawing, is designed as the protected connection to the electronic appliance. In the way depicted in these embodiments of the EMP-charge eliminator device, an earth connection is intended by means of a screw coupling or by means of an duct in the housing. For this purpose, a screw coupling 18 or a flange 13 is provided on the housings 10. The flange together with a washer 17 or similar and with a nut 16 provides a screw connection to the housing wall. An additional seal or packing 14 of refined soft copper serves as a low resistance contact of poor inductivity. Other possibilities of forming such connections may be created by technically competent persons in relation to this invention.

An external hollow cylinder is screwed into or fixed onto a central section 106 of the external conductor 10. This external hollow cylinder 20 has an end-cap 21 screwed onto it. The charge eliminator component 28 is inserted into this end-cap 21. A number of designs of charge eliminator components 28 are possible. The charge eliminator component 28 may be in the form of a gas discharge voltage overload eliminator (see FIG. 1 and 2), or also in the form of a Varistor (see FIGS. 3), or in the form of a diode, eg. Transzorb Diode, Zener Diode, suppressor diode, protective diode etc (see FIG. 4). It is of advantage if the charge eliminator component 28 is exchangable and may be easily and quickly replaced with the removal of the end-cap 21. The effective electrical length of the conductor 24 is to be determined according to the electrically extended lamda/4 wavelength of the frequency band to be transmitted. The charge eliminator component 28 contacts both the conductor 24 and the end-cap 21. The disc 40 with the concentrated capacitor 41 is arranged in parallel to the charge eliminator component 28. The conductor 24, between the internal conductor 30 and the charge eliminator component 28 acts by means of the capacitance of capacitor 41 as a lamda/4 short-circut lead for the frequency band to be transmitted.

The effective electrical length of conductor 24 may be geometrically shortened by means of the inclusion of di-electrical material 25 in the region of conductor 24. For this reason, the hollow cylinder 20 and the conductor 24 are depicted as 'discontinuous' in FIG. 2 and 6. Furthermore, the length of conductor 24 may also be shortened geometrically by means of the incorporation of one or more concentrated capacitors or blind resistors, which, for example, may be one or more end-discs 26, formed as cavity or cylinder capacitors. Such design features are optional, but they have numerous advantages, they allow the charge eliminator device to be of small dimension and therefore easy to install, etc.

The band width of the frequency band to be transmitted may be determined by means of a division of the internal conductor 30 into different segments 31, 32, 33, 34 taking into account the particular wave impedances. By way of example, one set of such conductor segments 31, 32, 33, 34 is depicted in FIGS. 5 and 6. With such segments 31, 32, 33, 34 and their impedances it is possible to adjust, to an accuracy of one octave, via band pass transformation, the band width of the to be transmitted frequency band.

The concentrated capacitor 41 and the charge eliminator component 28 are arranged in parallel. Utilising the conductor 24, with the dielectric material in contact with conductor 24, with one or more end-discs 26 for conductor 24 and the use of the concentrated capacitor 41, it is possible to de-couple the charge eliminator component 28 sufficiently that no voltage peaks occur at the front face as a result of the transmission of RF frequency bands. In this way, for example, any pre-ionisation of a gas discharge voltage overload eliminator would be prevented.

The band width as well as the frequency range of the signal to be transmitted is determined by the conductor 24, by the dielectric materials 25 in contact with conductor 24, by the one or more end-discs 26 of conductor 24, and by the conductor segments 31, 32, 33, 34 and their impedances. In this manner, band widths as accurate as one octave are achieved while simultaneously transmitting AC/DC supply voltages and protecting them from damaging voltage surges, thus protecting electronic appliances of all types from the damage of EMP-impacts. For example, frequency bands of between 100 MHz and 30 GHz may be transmitted. The maxima of the transmitted frequencies are not really limited by the circuitry of this invention, rather it is the connector parameters which are the limiting factors. It is therefore possible to transmit frequencies far above 30 GHz by using other connector paramenters.

What is claimed is:

1. A de-coupled EMP-charge eliminator device in a co-axial cable, comprising:

a charge eliminator component in electric contact with a conductor leading to an internal conductor of the co-axial cable; and a housing attached to an external conductor of the co-axial cable with a concentrated capacitor inserted in parallel with the charge eliminator component between said housing and said conductor with said concentrated conductor placed so as not to break the electrical connection provided by said internal conductor, such that via the capacitance of the concentrated capacitor (, an RF-shortcircuit breaker is formed so that said conductor acts as a lamda/4 short-circuit conductor for a frequency band to be transmitted.

2. The decoupled EMP-charge eliminator device according to claim 1, wherein a gas discharge voltage overload eliminator is the charge eliminator component.

3. The de-coupled EMP-charge eliminator device according to claim 1, wherein a varistor is the charge eliminator component.

4. The de-coupled EMP-charge eliminator device according to claim 1, wherein a diode is the charge eliminator component.

5. The de-coupled EMP-charge eliminator device according to any one of claims 1 to 4 wherein a length of the conductor is set to a median value of an electrically extended lamda/4 wavelength of the frequency band to be transmitted.

6. The de-coupled EMP-charge eliminator device according to claim 5, wherein a dielectric material is placed in a region of said conductor to electrically extend the lamda/4 wavelength.

7. The de-coupled EMP-charge eliminator device according to claim 5, wherein at least one of a plurality of end-discs of said conductor electrically extend the lamda/4 wavelength.

8. The de-coupled EMP-charge eliminator device according to claim 5, wherein a bandwidth of the frequency band transmitted is determined by a diameter of the housing.

9. The de-coupled EMP-charge eliminator device according to claim 8, wherein at least one of a plurality of end-discs and cavity and cylinder capacitors in the region of said conductor form one of concentrated capacitors and blind resistors to electrically extend the lamda/4 wavelength.

10. An de-coupled EMP-charge eliminator device according to any one of claims 6–9, wherein the bandwidth of the frequency band is determined by differing a plurality of internal conductor segments corresponding to wave impedances.

11. The EMP-charge eliminator device according to any one of claims 6–9 wherein the charge eliminator component with minimal static and dynamic response voltage may be used for high transmission capacity requirements, without impairing reset characteristics of said charge eliminator component; and wherein the arrangement of the conductor and the concentrated capacitor provide for de-coupling of intermodulation products produced by the charge eliminating component from the RF-path.

12. The de-coupled EMP-charge eliminator device according to any one of claims 6–9, wherein the band width of the frequency band is determined by differing conductor segments corresponding to wave impedances; and wherein the charge eliminator component with minimal static and dynamic response voltage may be used for high transmission capacity requirements without impairing reset characteristics of said charge eliminator component; and an arrangement of said conductor and said concentrated capacitor provide for de-coupling of intermodulation products produced by the charge eliminating component from the RF-path.

* * * * *

UNITED STATES PATENT AND TRADEMARK OFFICE
CERTIFICATE OF CORRECTION

PATENT NO. : 6,101,080
DATED : August 8, 2000
INVENTOR(S) : Gregor Kühne

It is certified that error appears in the above-identified patent and that said Letters Patent is hereby corrected as shown below:

Title page,
Item [57], ABSTRACT,
Line 2, replace “an” with -- a --;
Line 11, replace “lamda/4” with -- lambda/4 --.

Column 1,
Line 4, replace “lamda/4” with -- lambda/4 --;
Lines 7 and 58, replace “an” with -- a --;
Line 18, replace “interferance” with -- interference --;
Line 30, replace “lamda/2” with -- lambda/2 -- (both occurrences);
Line 39, replace “HF” with -- RF --;
Line 40, replace “pre-ionisation” with -- pre-ionization --; and
replace “cause” with -- causes --;
Line 45, delete “the” (second occurrence);
Lines 58-59, replace “interchangibly” with -- interchangeably --;
Lines 60 and 63, replace “lamda/4” with -- lambda/4 --;
Line 62, replace “oscilatory” with -- oscillatory --; and
Line 64, replace “and” with -- as --.

Column 2,
Lines 14 and 21, replace “a electic” with -- an electric --;
Lines 15 and 22, replace “an” with -- a --;
Lines 25 and 29, replace “a electic” with -- an electric --;
Lines 26 and 30, replace “an” with -- a --;
Line 38, replace “a” with -- an --;
Line 41, replace “electical” with -- electrical --;
Line 48, replace “an” with -- a --; and
Line 67, replace “exchangable” with -- exchangeable --.

Column 3,
Lines 3 and 10, replace “lamda/4” with -- lambda/4 --;
Line 11, replace “short-circut” with -- short-circuit --;
Line 34, replace “Utilising” with -- Utilizing --;
Line 41, replace “pre-ionisation” with -- pre-ionization --; and
Line 58, replace “paramenters” with -- parameters --.

UNITED STATES PATENT AND TRADEMARK OFFICE

CERTIFICATE OF CORRECTION

PATENT NO. : 6,101,080 
DATED : August 8, 2000
INVENTOR(S) : Gregor Kühne

It is certified that error appears in the above-identified patent and that said Letters Patent is hereby corrected as shown below:

<u>Column 4,</u>
Line 2, replace “conductor” with -- capacitor --; and
Line 4, delete “(”; and
Lines 6 and 19, replace “lamda/4” with -- lambda/4 --.
Lines 23, 27 and 36, replace “lamda/4” with -- lambda/4 --.
Line 37, replace “An” with -- The --.

Signed and Sealed this

First Day of July, 2003

JAMES E. ROGAN
*Director of the United States Patent and Trademark Office*